(12) United States Patent
Hedgepeth

(10) Patent No.: US 6,317,385 B1
(45) Date of Patent: Nov. 13, 2001

(54) AQUACULTURE FEEDING MONITOR

(75) Inventor: John Hedgepeth, San Luis Obispo, CA (US)

(73) Assignee: Instituto Fomento Pesquero, Valparaiso (CL)

( * ) Notice: Subject to any disclaimer, the term of this patent is extended or adjusted under 35 U.S.C. 154(b) by 0 days.

(21) Appl. No.: 09/370,614

(22) Filed: Aug. 7, 1999

(51) Int. Cl.[7] .......................... G01S 15/96; A01K 61/02
(52) U.S. Cl. .......................... 367/90; 367/110; 367/112
(58) Field of Search .................. 367/93, 94, 87, 367/90, 89, 110–113, 115, 116; 119/51.04

(56) References Cited

U.S. PATENT DOCUMENTS

| | | | |
|---|---|---|---|
| 5,978,315 | * | 11/1999 | Molaug ............................. 367/90 |
| 6,000,362 | * | 12/1999 | Blyth et al. .................... 119/51.04 |

OTHER PUBLICATIONS

K.P. Ang, R.J. Petrell; Control of feed dispensation in seacages using underwater video monitoring: effects on growth and food conversion, Aquacultural Engineering, May 15, 1996, pp. 45–62, vol. 16 (1997), Elsevier Science, New York, NY.

J.E. Juell, D.M. Furevik & A. Bjordal; Demand Feeding in Salmon Farming by Hydroacoustic Food Detection; Aquacultural Engineering, Sep. 30, 1992, pp. 155–167, vol. 12 (1993), Elsevier Science, New York, NY.

J.E. Juell; Hydroacoustic Detection of Food Waste—A Method to Estimate Maximum Food Intake of Fish Populations in Sea Cages; Aquacultural Engineering, May 28, 1991, pp. 207–217, vol. 10 (1991), Elsevier Science, New York, NY.

M. Dunn & K. Dalland; Observing behaviour and growth using the Simrad FCM 160 Fish Cage Monitoring System; Fish Farming Technology, 1993, pp. 269–274, Balkema, Rotterdam.

P.J. Blyth, G.J. Purser & J.F. Russell; Detection of feeding rhythms in seacaged Atlantic salmon using new feeder technology, Fish Farming Technology, 1993, pp. 209–216, Balkema, Rotterdam.

A. Bjordal, J.E. Juell, T. Lindem, A. Ferno; Hydroacoustic monitoring and feeding control in cage rearing of Atlantic salmon, Fish Farming Technology, 1993, pp. 203–208, Balkema, Rotterdam.

J.E. Juell, J.C. Holm, A.K. Beltestad; In situ acoustic observation of food consumption in caged Atlantic mackerel, Fisheries Research, Dec. 9, 1995, pp. 131–135, vol. 27 (1996), Elsevier Science, New York, NY.

M. Foster, R. Petrell, M.R. Ito, R. Ward; Detection and Counting of Uneaten Food Pellets in a Sea Cage Using Image Analysis, Aquacultural Engineering, Aug. 8, 1994, pp. 251–269, vol. 14, No. 3 (1995), Elsevier Science, New York, NY.

* cited by examiner

*Primary Examiner*—Ian J. Lobo
(74) *Attorney, Agent, or Firm*—Miller Nash LLP

(57) ABSTRACT

The invention is a system for measuring the rate of food pellet loss in a fish farming operation. The fish are held in a seacage in a body of water. Food dropped into the seacage sinks down through the cage and uneaten pellets exit the bottom of the seacage. An echo transducer below the cage generates an echo pattern that is converted into pellet loss data.

9 Claims, 3 Drawing Sheets

AQUACULTURE FEEDING MONITOR

TECHNICAL FIELD

The present invention relates to monitoring systems for detecting the amount of food waste in a large-scale fish farming operation.

BACKGROUND INFORMATION

Feed costs significantly impact the profitability of commercial fish farming operations. Fish farms use floating "seacages" to hold the fish. These cages are made of a mesh material (net or webbing). The net is sized to prevent fish escape while allowing free circulation of water through the cage. The net completely encapsulates the fish with the exception of surface water (that is, the cage surrounds the fish in the water around the sides and the bottom).

Somewhat analogous to feeding pet fish in an aquarium, commercially raised fish are fed by dropping food pellets into the water in the seacage. The amount of food needed is hard to judge accurately. Unlike other animals, the feeding urges of fish are more sensitive to environmental changes and other factors. What is adequate feeding one day may be overfeeding the next. In order to promote maximum growth, it is desirable to feed the fish as much as they will eat. However, overfeeding creates waste and unnecessary cost.

The fish consume the feed as it is dropped into the seacage. This is a dynamic process where the fish must "catch" the food as it slowly sinks down. Whatever is not eaten escapes the cage through the bottom and eventually rests on the bottom of the sea, lake, or riverbed in which the cage is located.

The present invention provides a way to monitor overfeeding and thereby reduce food waste by tracking the quantity of feed that escapes through the bottom of the cage.

SUMMARY OF THE INVENTION

The invention is a scanning acoustic transducer positioned below a seacage. The transducer generates an acoustic beam that is transmitted below the seacage—across the path of the fish feed as it exits below the cage. The acoustic beam echoes back to the transducer, thereby providing an "echo sound" for a sonar display. The transducer is connected to a controller that processes the echo sound signal and calibrates the signal to the rate of food waste dropping from the cage.

More specific details of the invention are described below.

BRIEF DESCRIPTION OF THE DRAWINGS

In the drawings, like reference numerals refer to like parts throughout the various views, and wherein.

BEST MODE FOR CARRYING OUT THE INVENTION

Figure 1:
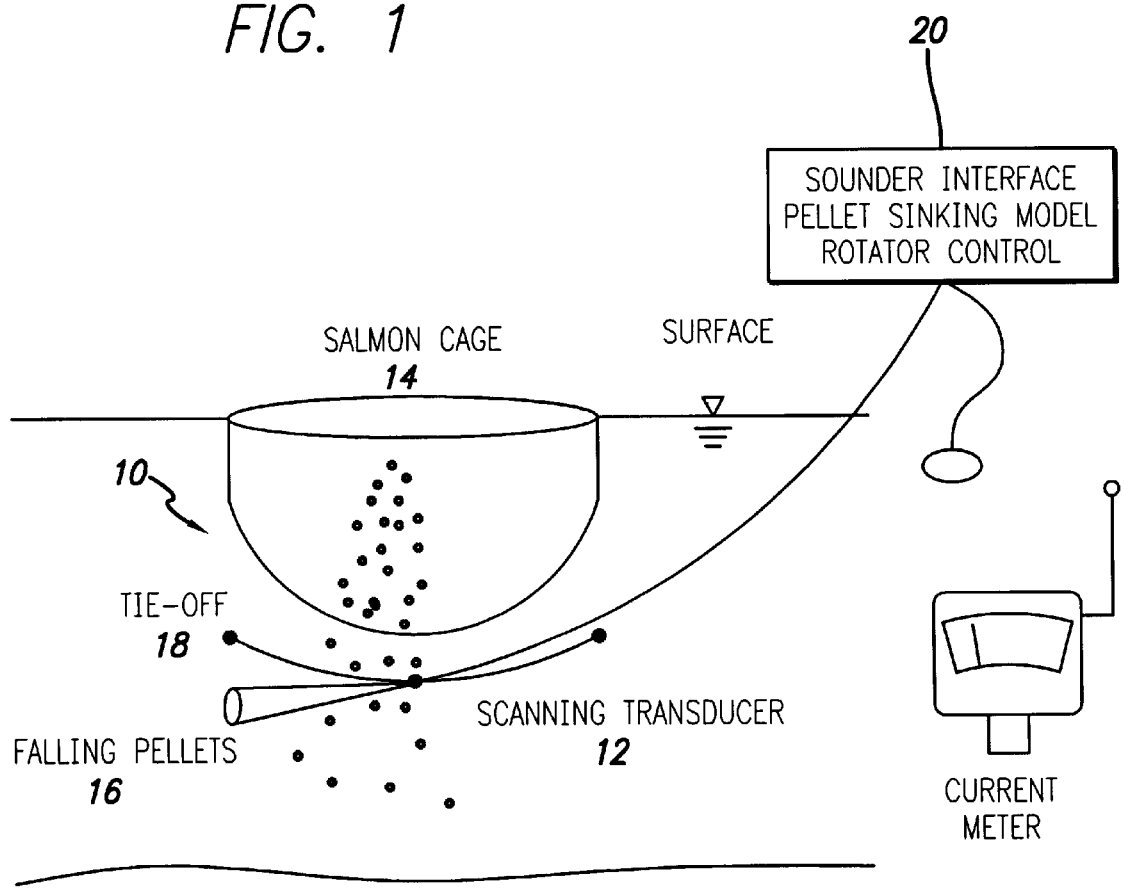
FIG. 1 is a pictorial view of an aquaculture feeding monitor constructed in accordance with the invention.

Referring now to the drawings, and first to FIG. 1, shown generally at 10 is an aquaculture feeding monitor system constructed in accordance with a preferred embodiment of the invention. The monitor system 10 includes a scanning transducer 12 positioned below a salmon cage (i.e., seacage) 14. As described above, the seacage 14 floats in a body of water and holds a quantity of fish (typically salmon) that are grown for retail sale. Seacages are well-known in fish farming operations and need not be further described here.

The transducer 12 should be located near the center point below the seacage 14—as close as possible to the bottom of the seacage net. Food pellets sink slowly through the seacage. Therefore, placing the transducer as close as possible minimizes the lapse time to detect food pellets as they drop down through the bottom of the seacage 14. The food pellets are indicated schematically at 16 in FIG. 1.

The transducer 12 is preferably a 200 kHz transducer capable of emitting a circular beam pattern at a full beam angle of 6 degrees (−3 dB) and having side lobes that are less than −20 dB. The transducer scans 360 degrees in a horizontal plane around the transducer 12 and vertically from 0 degrees to +80 degrees upward, and 0 degrees to −20 degrees downward. The transducer is rigged in a "cardanic suspension" which keeps the transducer in a stable horizontal and vertical position, regardless of changes in water current or seacage movements. This type of suspension technique is well known and is schematically indicated by the tie-offs 18. While it is important to place the transducer 12 as close as possible to the seacage 14, the distance is limited by the noise pattern produced by the bottom of the net.

The transducer 12 is essentially off-the-shelf and can be obtained from different sources with the above performance specifications. However, a suitable transducer that will perform according to the requirements of this invention is the DT 4000-RT model single-beam transducer sold by BioSonics, 4027 Leary Way NW, Seattle, Wash. 98107. This transducer is capable of emitting a single beam at a variety of angles and frequencies, including the above specifications.

Figure 2:
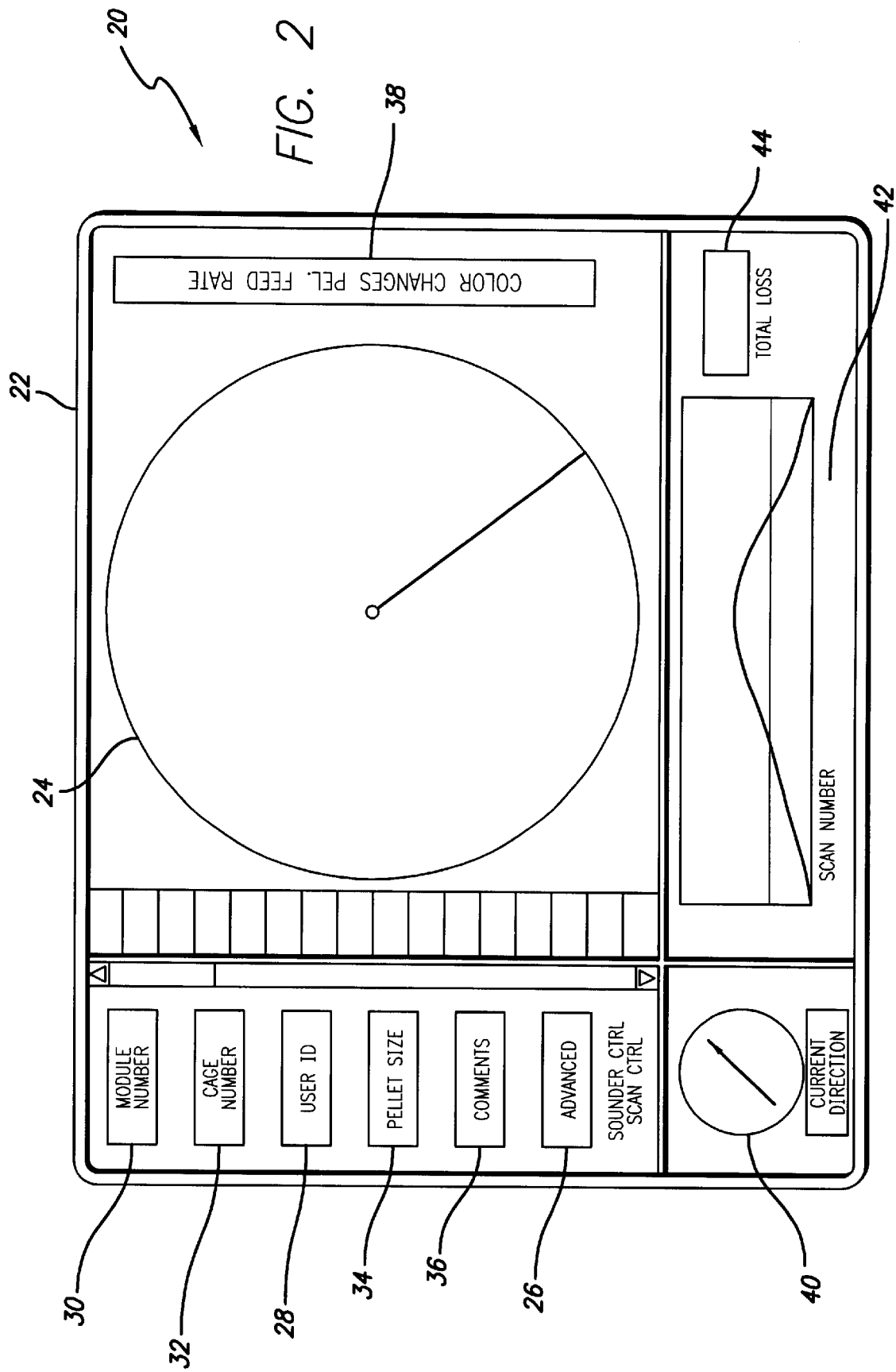
FIG. 2 is a pictorial view of a sonar display for depicting the rate of feed waste.

The transducer 12 is remotely connected to a conventional laptop or palm top personal computer, indicated schematically at 20 in FIG. 2. The mode of connection is conventional and would be well understood by anyone skilled in the art after having acquired the type of transducer described above. However, data is delivered from the transducer 12 to the PC 20 via conventional TCP/IP protocols.

Referring now to FIG. 2, the screen display 22 of the PC 20 is a polar plot indicator (PPI) 24 typical to sonar displays. The PPI 24 indicates the ping bearings for the transducer. On the left of the display 22, indicated at 26, is the sounder and scan control for the transducer 12. The display 22 includes edit fields that allow switching between different seacages, if applicable. That is, it is likely that multiple transducers 12 will be used in large scale fish farming operations having numerous cages. All of the transducers may be connected to a single PC 20. In which case, it is desirable to allow the operator to input data specific to cage or transducer, which may include items of information like the operators initials 28, transducer (module) number 30, or cage number 32. To monitor the food waste rate for each cage, the operator will input the pellet size and type 34 and the amount fed or being dropped into the cage 36.

On the right-hand side of the display 22 is a color bar 38 that provides a visual alarm to indicate overfeeding. The system 10 is programmed such that the color of the bar changes with the amount of food waste. As indicated at 40, the lower left-hand corner of the display 22 shows water current direction, speed, and temperature (if desired). Finally, the bottom center region 42 of the display 22 is a strip chart of the food pellet loss rate (that is, the rate of food pellets falling below the seacage 14). It also includes a readout of the total loss, as indicated at 44.

The means for processing the signals from the transducer 12 to produce the above features of display 22 are a function of software programming. The software can be written in different ways, including using Visual C++. The software programming requirements are as follows.

The software includes an algorithm for measuring pellet waste based on a measured density. The density can be measured by either echo counting or echo integration—two techniques that are familiar to anyone skilled in the art. A measure of density is made by the transducer 12 via a scan in a predetermined scan window. The scan window may vary depending on the type of food pellet involved as well as the speed and direction of water currents. There are different shapes and specific weights of pellet which create different reflections and also have different sink rates. Basically, a scan is defined as all "pings" through the window in a single rotator sweep of the transducer 12. Therefore, density can be computed using EMS (or other inversion) or echo integration methodology with the output of $\rho = \#/m^3$. The number of pellets estimated to fall over the period of one scan is:

$$\frac{\#}{scan} = t\rho Q$$

=number of pellets
t=time of scan in seconds
$\rho = \#/m^3$
Q=area of window times pellet sinking rate ($m^3/s$)

An estimate of pellet sinking rate can be either made by tracking individual pellets on a ping to ping basis or by using a known rate. Note that $\rho$ Q gives the pellet flux rate through the window in terms of pellets per second.

Data from the transducer 12 will be recorded and include a record of echoes with range, bearing, and time. A record of nulls (or omissions without echoes) should also be made.

A second algorithm is used to record the background noise against which pellets can be detected. A suitable algorithm is set forth below:

$$\Delta_t = \frac{A_{t-n}S_{t-n} + A_{t-n-1}S_{t-n-1} + \ldots + A_{t-1}S_{t-1}}{A_{t-n} + A_{t-n-1} + \ldots + A_{t-1}} - S_t$$

By skewing weights to past events, any noise from other structures such as the seacage can be recognized and eliminated to create data that indicates only the number of pellets from the seacage.

Figure 3:
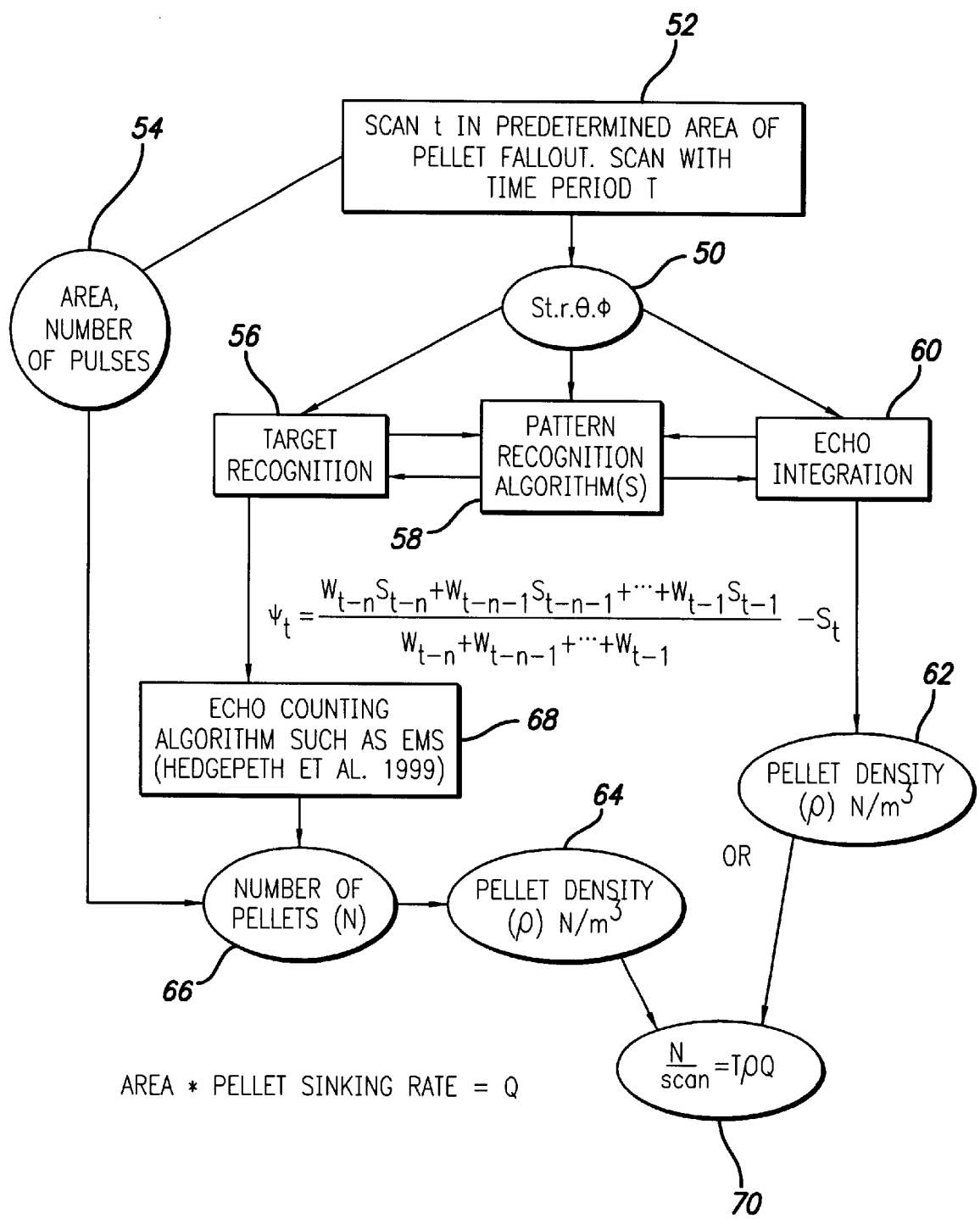
FIG. 3 is a schematic flow chart illustrating the software programming requirements of the invention.

The general programming requirements for the system 10 are illustrated in FIG. 3. FIG. 3 is a flow chart that illustrates the logic necessary to develop algorithms that can generate the density of feed dropping from the seacage in a single transducer scan, less echoes caused by the cage or other things that may create undesirable signals. Briefly, data can be generated that estimates feed drop rate from echo envelope amplitudes as a function of range(r), time (t), bearing (theta), and elevation (phi). As shown at 52, the transducer 12 is used to make a scan at a certain time (t) over a preset time period (T). The scan generates a sampling of echo data S, as shown at 50. The extent of the scan defines an area 54 through which pellets fall. By using a combination of conventional target recognition 56, pattern recognition 58, and echo integration 60, it is possible to determine pellet density 62. Alternatively, as shown at 64, pellet density can be determined by obtaining the number of pellets 66 via echo counting techniques 68, within the area 54. The pellet flux Q, as indicated at 70, is estimated from the area multiplied by a pre-measured or modeled pellet sinking velocity. Total food pellet loss is the product of the pellet flux Q and pellet density in the measured time period T.

Modeled pellet sinking velocities are required in order to implement the algorithms. Pellet sinking acceleration and velocity are a function of pellet type, that is, pellet size, shape, and weight and method feeding (e.g., hand feeding or automated feeding). Sinking velocities and dispersion are measured empirically via any number of different ways that would be conventionally known. Transducer calibration must also be done by divers below the seacage 14 in order to develop a baseline signal required for the pattern recognition algorithm.

A person skilled in the art would know how to implement the above pattern recognition algorithm and related equations to develop software that provides the necessary food loss information below the seacage. Nevertheless, the invention is not intended to be limited by the type of algorithm used or the above description. Instead, the spirit and scope of the invention is to be limited only by the patent claim or claims set forth below.

What is claimed is:

1. An aquaculture feeding monitor for use in monitoring the amount of food waste dropping below a seacage, comprising:

an acoustic transducer positioned below the seacage for generating an acoustic signal from food dropping below the seacage, wherein the acoustic transducer scans 360 degrees in a horizontal plane around the transducer to sample food density across a horizontal plane; and a processor connected to the acoustic transducer for converting the acoustic signal into a rate of food loss, wherein the processor generates a screen display comprising:

a polar plot indicator;

a sounder and scan control; and one or more editable data fields.

2. An aquaculture feeding monitor as defined in claim 1 wherein the acoustic transducer has a full beam angle of 6°.

3. An aquaculture feeding monitor as defined in claim 1 wherein the acoustic transducer has the capability to scan vertically from 0° to −80° and from 0° to −20°.

4. An aquaculture feeding monitor as defined in claim 1 wherein the acoustic transducer is a 200 kHz transducer.

5. An aquaculture feeding monitor as defined in claim 1 wherein the processor is a conventional computer.

6. An aquaculture feeding monitor as defined in claim 5 wherein the computer generates a screen display comprising:

a color bar that provides a visual alarm to indicate overfeeding.

7. An aquaculture feeding monitor as defined in claim 5 wherein the computer generates a screen display comprising:

a strip chart of the food pellet loss rate including a readout of the total loss.

8. An aquaculture feeding monitor as defined in claim 5 wherein the computer generates a screen display comprising:

an indication of water current direction, speed, and temperature.

9. An aquaculture feeding monitor as defined in claim 1 wherein the processor converts the acoustic signal into a rate of food loss via an algorithm for measuring pellet waste based on a measured density of pellets.

* * * * *